United States Patent
Suitsu

(10) Patent No.: US 7,113,083 B2
(45) Date of Patent: Sep. 26, 2006

(54) PASSIVE KEYLESS ENTRY DEVICE FOR MONITORING TIRE PNEUMATIC PRESSURE BY BIDIRECTIONAL COMMUNICATION

(75) Inventor: Katsumi Suitsu, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 228 days.

(21) Appl. No.: 10/729,002

(22) Filed: Dec. 4, 2003

(65) Prior Publication Data

US 2004/0113765 A1 Jun. 17, 2004

(30) Foreign Application Priority Data

Dec. 10, 2002 (JP) ............................. 2002-358141

(51) Int. Cl.
*B60C 23/00* (2006.01)
(52) U.S. Cl. ................. 340/442; 340/447; 340/426.13; 340/426.28; 340/426.33; 73/146.2
(58) Field of Classification Search ................ 340/442, 340/447, 426.13, 426.16, 426.17, 426.18, 340/426.33, 426.28; 73/146.2; 701/2, 29, 701/69
See application file for complete search history.

(56) References Cited

U.S. PATENT DOCUMENTS

| | | | |
|---|---|---|---|
| 5,463,374 A | 10/1995 | Mendez et al. | |
| 6,448,892 B1 | 9/2002 | Delaporte | |
| 6,647,773 B1 * | 11/2003 | Nantz et al. ............... | 73/146.5 |
| 6,745,624 B1 * | 6/2004 | Porter et al. ............... | 73/146.2 |
| 6,774,779 B1 * | 8/2004 | Lin ............................ | 340/447 |
| 6,885,282 B1 * | 4/2005 | Desai et al. ............... | 340/5.61 |
| 6,885,283 B1 * | 4/2005 | O'Connor et al. ......... | 340/5.61 |
| 2002/0087250 A1 | 7/2002 | Pacsai | |

FOREIGN PATENT DOCUMENTS

EP 0 667 597 8/1995
EP 1 211 104 11/2001

OTHER PUBLICATIONS

European Patent Office Communication dated Nov. 30, 2005, 4 pages.

* cited by examiner

*Primary Examiner*—Davetta W. Goins
(74) *Attorney, Agent, or Firm*—Brinks Hofer Gilson & Lione

(57) ABSTRACT

A passive keyless entry device is constructed by a car mounting device mounted to an automobile, a portable device and transmitter-receivers for monitoring a tire pneumatic pressure. The car mounting device has a low frequency signal transmitting section for transmitting a request signal to the portable device and the transmitter-receivers for monitoring the tire pneumatic pressure, a receiving section for a keyless entry for receiving an answer signal responsive to the request signal from the portable device, a receiving section for monitoring the tire pneumatic pressure for receiving the answer signal responsive to the request signal from the transmitter-receivers for monitoring the tire pneumatic pressure, and a controller for forming the request signal and controlling the operation of a door lock mechanism in response to the answer signal and displaying tire pneumatic pressure information.

8 Claims, 6 Drawing Sheets

PASSIVE KEYLESS ENTRY DEVICE FOR MONITORING TIRE PNEUMATIC PRESSURE BY BIDIRECTIONAL COMMUNICATION

This application claims the benefit of priority to Japanese Patent Application No. 2002-358141, herein incorporated by reference.

BACKGROUND OF THE INVENTION

1. Field of the Invention

The present invention relates to a passive keyless entry device also having a function for monitoring a tire pneumatic pressure by performing communication in both directions, and particularly, relates to a passive keyless entry device for monitoring the tire pneumatic pressure in which the tire pneumatic pressure can be stably monitored for a long time by performing the bidirectional communication and the entire construction is simplified by commonly using portions commonly usable in the passive keyless entry device and the tire pneumatic pressure monitoring device.

2. Description of the Related Art

There is conventionally a passive keyless entry (passive RKE) device for releasing a door lock and starting an engine by using a portable device from the exterior of an automobile as a device mounted to the automobile. Further, there is a tire pneumatic pressure monitoring device (TPMS) for periodically monitoring the pneumatic pressure of the tire by using a pneumatic pressure sensor mounted to each tire. In these devices, the main function of the passive keyless entry device is to release the door lock and start the engine, and the main function of the tire pneumatic pressure monitoring device is to monitor the pneumatic pressure of the tire. Accordingly, their functions are different from each other. Therefore, these devices are normally respectively mounted to the automobile as separate devices.

Here, FIG. 5 is a block diagram showing one example of the construction of a main portion of the already known passive keyless entry (passive RKE) device.

As shown in FIG. 5, this passive keyless entry device is constructed by a car mounting device 40 mounted to the automobile and a portable device 41 individually carried by a user, etc. In this case, the car mounting device 40 has a tuner section 42, a low frequency signal amplifying section (LF AMP) 43 and a controller 44. The tuner section 42 is connected to a high frequency wave receiving antenna 42(1) and converts a high frequency signal received by the high frequency wave receiving antenna 42(1) into a base band signal and outputs the base band signal. The low frequency signal amplifying section (LF AMP) 43 is connected to four low frequency wave transmitting antenna (down link antennas) 43(1), 43(2), 43(3), 43(4) individually arranged within the door handles of four doors of the automobile, and transmits a low frequency wireless signal in time division through each of the four low frequency wave transmitting antenna 43(1) to 43(4). The controller 44 controls the transmitting operation of the low frequency signal from the low frequency signal amplifying section 43 and also controls the operation of a car mounting control member such as a door lock mechanism 45, etc. in response to the supplied base band signal. The controller 44 is connected to the door lock mechanism 45 arranged in each door of the automobile, and an engine starting section 46 arranged in the vicinity of the engine.

This passive remote keyless entry device is schematically operated as follows.

The car mounting device 40 supplies a request signal in time division at a constant time interval from the low frequency signal amplifying section 43 to the four transmitting antennas 43(1) to 43(4) by the control of the controller 44. The low frequency wireless signal is transmitted from the corresponding transmitting antennas 43(1) to 43(4). At this time, when a user carrying the portable device 41 approaches the automobile and this portable device 41 receives the request signal transmitted from one of the low frequency wave transmitting antenna 43(1) to 43(4), e.g., the low frequency wave transmitting antenna 43(1), the portable device 41 forms an answer signal including an ID proper to this portable device 41 in response to the received request signal, and transmits the formed answer signal as a high frequency wireless signal. At this time, when the high frequency wave receiving antenna 42(1) receives this high frequency wireless signal on the car mounting device 40 side, the tuner section 42 receives and processes this high frequency wireless signal and converts the processed signal into a base band signal including the ID, and supplies the converted base band signal including the ID to the controller 44. When the base band signal including the ID is supplied to the controller 44, the controller 44 judges whether the supplied ID is conformed to one of IDs already registered or not. When the controller 44 judges that the supplied ID is conformed to the already registered ID, the controller 44 releases the operation of a car mounting control member according to the control contents instructed by the supplied base band signal, e.g., the door lock mechanism 45 of a door knob on the driver's seat side of the automobile. Thus, the user (driver) can open the driver's seat side door and can ride in the automobile by performing such control.

After such control is performed, the engine can be also subsequently started by setting the passive keyless entry device. When the passive keyless entry device is set in this way and the user (driver) rides in the automobile, communication using a wireless signal is performed between the car mounting device 40 and the portable device 41 carried by the user (driver). When the controller 44 confirms that the ID transmitted from the portable device 41 is the same ID as the ID of the portable device 41 judged just before by this communication, the controller 44 supplies a starting signal to the engine starting section 46 and makes the engine starting section 46 start the engine.

FIG. 6 is a block diagram showing one example of the construction of a main portion of the already known tire pneumatic pressure monitoring device (TPMS).

As shown in FIG. 6, this tire pneumatic pressure monitoring device is constructed by a TPMS receiver 50 arranged within the automobile, and TPMS transmitters (TPMS TX) 51(1), 51(2), 51(3), 51(4) individually mounted to four tires of the automobile. In this case, the TPMS receiver 50 has four high frequency wave receiving antennas 52(1), 52(2), 52(3), 52(4), a mixer section (MIX) 52, a TPMS tuner section 53, a signal intensity instructing section (RSSI) 54, a controller 55, a display section 56 and an alarm generating section 57. The four high frequency wave receiving antennas 52(1), 52(2), 52(3), 52(4) are arranged so as to correspond to the four TPMS transmitters 51(1), 51(2), 51(3), 51(4), and individually receive high frequency wireless signals transmitted from the corresponding TPMS transmitters 51(1) to 51(4). The mixer section 52 is connected to the four high frequency wave receiving antennas 52(1) to 52(4), and mixes and outputs the high frequency signals received by the four high frequency wave receiving antennas 52(1) to 52(4). The TPMS tuner section 53 receives the mixed high frequency signal and converts the mixed high frequency signal into a detecting signal showing the tire pneumatic pressure and outputs this detecting signal. The signal intensity instructing section 54 shows detecting signal intensity based on the detecting signal outputted from the TPMS tuner section 53. The controller 55 receives the detecting signal outputted from the TPMS tuner section 53 and the detecting signal intensity obtained by the signal intensity instructing section 54, and generates a tire pneumatic pressure measuring signal, an alarm signal showing a tire pneumatic pressure abnormality, etc. The display section 56 displays the tire pneumatic pressure measuring signal. The alarm generating section 57 generates an alarm when the alarm signal is supplied. A pressure sensor for detecting the tire pneumatic pressure is built in each of the TPMS transmitters 51(1), 51(2), 51(3), 51(4) although this pressure sensor is unillustrated.

This tire pneumatic pressure monitoring device (TPMS) is schematically operated as follows.

When a tire pneumatic pressure detecting time point allocated to the self transmitter has come, each of the four TPMS transmitters 51(1), 51(2), 51(3), 51(4) measures the pneumatic pressure of the corresponding tire by the built-in pressure sensor and transmits the measured tire pneumatic pressure measuring signal as a high frequency wireless signal. In this case, for example, the tire pneumatic pressure detecting time point is set to once for 30 minutes to one hour every each of the TPMS transmitters 51(1) to 51(4) at the stopping time (unusing time) of the automobile, and is also set to about once for one to three minutes at the running time (using time) of the automobile. The arriving time of the tire pneumatic pressure detecting time point is different every each of the four TPMS transmitters 51(1), 51(2), 51(3), 51(4), and the tire pneumatic pressure detecting time point comes in a sequential order in accordance with a determined period. When the tire pneumatic pressure detecting time point has come and the high frequency wave receiving antennas 52(1), 52(2), 52(3), 52(4) arranged correspondingly to the four TPMS transmitters 51(1), 51(2), 51(3), 51(4) sequentially receives this high frequency wireless signal on the TPMS receiver 50 side, the mixer section 52 mixes these received high frequency signals and converts these high frequency signals into a serial signal and supplies the converted serial signal to the TPMS tuner section 53. The TPMS tuner section 53 converts the supplied serial signal into a detecting signal showing the tire pneumatic pressure, and supplies the obtained detecting signal to the signal intensity instructing section 54 and the controller 55. The signal intensity instructing section 54 converts the supplied detecting signal into a detecting signal intensity showing its signal intensity, and supplies the converted detecting signal intensity to the controller 55. When the detecting signal and the detecting signal intensity are supplied to the controller 55, the controller 55 judges whether the supplied detecting signal intensity lies within the range of a prescribed intensity or not. When the controller 55 judges that this detecting signal intensity lies within the range of the prescribed intensity, the controller 55 makes the display section display the tire pneumatic pressure value shown by the detecting signal. In contrast to this, when the controller 55 judges that this detecting signal intensity does not lie within the range of the prescribed intensity, the controller 55 makes the display section display the tire pneumatic pressure value shown by the detecting signal and operates the alarm generating section 57 so as to inform the user (driver), etc. that the tire pneumatic pressure value has become abnormal. In this case, the alarm generated from the alarm generating section 57 may be set to ring a buzzer and turn on or off an alarm display lamp.

The above already known passive keyless entry device and the tire pneumatic pressure monitoring device were respectively recognized as devices for achieving separate independent functions. Therefore, when these devices are mounted to the automobile, these devices are mounted to suitable portions within the automobile every device.

Various car mounting devices are generally arranged within the automobile in addition to these devices. Therefore, a utilization space able to mount these devices is limited, and there is a case in which it is difficult to mount these devices to suitable portions within the automobile every each of these devices. Further, when these devices can be mounted to the automobile but are arranged in proximity to each other, these devices mutually utilize wireless signals so that the situation that their wireless signals interfere with each other and no exact control can be performed, is caused in a certain case.

SUMMARY OF THE INVENTION

The present invention is made in consideration of such a technical background, and its object is to provide a passive entry device having a tire pneumatic pressure monitoring function able to extend the life of a battery of a transmitter-receiver for monitoring the tire pneumatic pressure individually mounted to a tire by monitoring the tire pneumatic pressure by the bidirectional communication, and improve safety, and effectively utilize the space within a car at the car mounting time by commonly using portions of the passive keyless entry device and the tire pneumatic pressure monitoring device, and remove the interference between these devices.

To achieve the above object, a passive keyless entry device having a tire pneumatic pressure monitoring function in the present invention is constructed by a car mounting device mounted to an automobile, a keyless entry portable device and a transmitter-receiver for monitoring the tire pneumatic pressure, and the car mounting device has means comprising a low frequency signal transmitting section for transmitting a request signal of a low frequency to the keyless entry portable device and the transmitter-receiver for monitoring the tire pneumatic pressure, a receiving section for a keyless entry for receiving an answer signal of a high frequency responsive to the request signal from the keyless entry portable device, a receiving section for monitoring the tire pneumatic pressure for receiving the answer signal of the high frequency responsive to the request signal from the transmitter-receiver for monitoring the tire pneumatic pressure, and a controller for forming the request signal and controlling the operation of a door lock mechanism in response to the answer signal and obtaining tire pneumatic pressure information.

In accordance with the above means, the life of a battery of the transmitter-receiver for monitoring the tire pneumatic pressure individually mounted to the tire can be extended and safety is improved by monitoring the tire pneumatic pressure by the bidirectional communication. Further, the controller used in the passive keyless entry device and the controller used in the tire pneumatic pressure monitoring device are commonly used. Furthermore, the low frequency signal transmitting section for transmitting the low frequency request signal and four low frequency wave transmitting antennas are commonly used in both the keyless entry portable device of the passive keyless entry device and the transmitter-receiver for monitoring the tire pneumatic pressure in the tire pneumatic pressure monitoring device. The high frequency wireless signal transmitted from the keyless entry portable device is individually received by the receiving section for the keyless entry, and the high frequency wireless signal transmitted from the transmitter-receiver for monitoring the tire pneumatic pressure is individually received by the receiving section for monitoring the tire pneumatic pressure. Processing signals processed by both the receiving sections are supplied to the commonly used controller. The commonly used controller performs an operation so as to control the operation of the door lock mechanism and display the tire pneumatic pressure information. Accordingly, the function of the passive keyless entry device and the function of the tire pneumatic pressure monitoring device can be alternately achieved by using a small number of constructional parts. Therefore, the space within the car can be effectively utilized without generating the interference between both the devices.

DESCRIPTION OF THE PREFERRED EMBODIMENTS

The embodiment modes of the present invention will next be explained with reference to the drawings.

Figure 1:
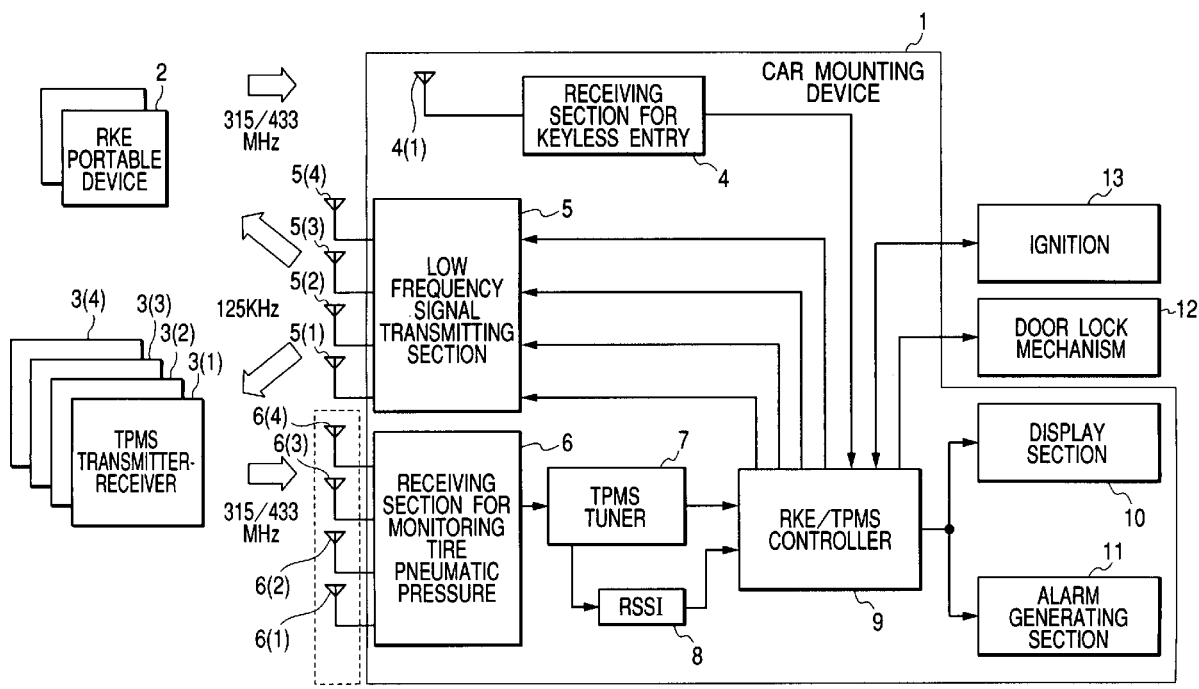
FIG. 1 relates to one embodiment mode of a passive keyless entry device having a tire pneumatic pressure monitoring function in the present invention, and is a block diagram showing its main portion construction.

FIG. 1 relates to one embodiment mode of a passive keyless entry device having a tire pneumatic pressure monitoring function in the present invention and is a block diagram showing its main portion construction.

As shown in FIG. 1, the passive keyless entry (passive RKE) device having the tire pneumatic pressure monitoring function in this embodiment mode is constructed by a car mounting device 1 mounted to an automobile, a keyless entry portable device (RKE portable device) 2 individually carried by a user, etc., and transmitter-receivers for monitoring a tire pneumatic pressure (TPMS transmitter-receivers) 3(1), 3(2), 3(3), 3(4) individually mounted to four tires of the automobile.

In this case, the car mounting device 1 has a receiving section for a keyless entry (RKE tuner) 4, four low frequency wave transmitting antenna (down link antennas) 5(1), 5(2), 5(3), 5(4), a low frequency signal amplifying section (LF AMP) 5, four high frequency wave receiving antennas 6(1), 6(2), 6(3), 6(4), a mixer section (MIX) 6, a receiving section for monitoring the tire pneumatic pressure (TPMS tuner) 7, a signal intensity instructing section (RSSI) 8, a commonly used controller 9, a display section 10 and an alarm generating section 11. The receiving section 4 for a keyless entry is connected to a high frequency wave receiving antenna 4(1) for receiving a high frequency wireless signal (first answer signal) transmitted by the keyless entry portable device, and converts the high frequency signal received by the high frequency wave receiving antenna 4(1) into a base band signal, and outputs this base band signal. The four low frequency wave transmitting antennas 5(1), 5(2), 5(3), 5(4) are individually arranged within the door handles of four doors of the automobile. The low frequency signal amplifying section 5 is connected to the four low frequency wave transmitting antenna 5(1) to 5(4), and transmits a low frequency wireless signal (request signal) in time division from each of the four low frequency wave transmitting antenna 5(1) to 5(4). The four high frequency wave receiving antennas 6(1), 6(2), 6(3), 6(4) are arranged on the car body side in the vicinity of the four tires correspondingly to the four transmitter-receivers 3(1), 3(2), 3(3), 3(4) for monitoring the tire pneumatic pressure, and individually receive a high frequency wireless signal (second answer signal) transmitted by the corresponding transmitter-receivers 3(1) to 3(4) for monitoring the tire pneumatic pressure. The mixer section 6 is connected to the four high frequency wave receiving antennas 6(1) to 6(4) and mixes and outputs the high frequency signals received by the four high frequency wave receiving antennas 6(1) to 6(4). The receiving section 7 for monitoring the tire pneumatic pressure receives the mixed high frequency signal and converts the mixed high frequency signal into a detecting signal showing the tire pneumatic pressure and outputs the detecting signal. The signal intensity instructing section 8 shows detecting signal intensity on the basis of the detecting signal outputted from the receiving section 7 for monitoring the tire pneumatic pressure. In addition to this, the controller 9 is connected to a door lock mechanism 12 arranged within each door of the automobile, and an ignition 13.

Figure 2:
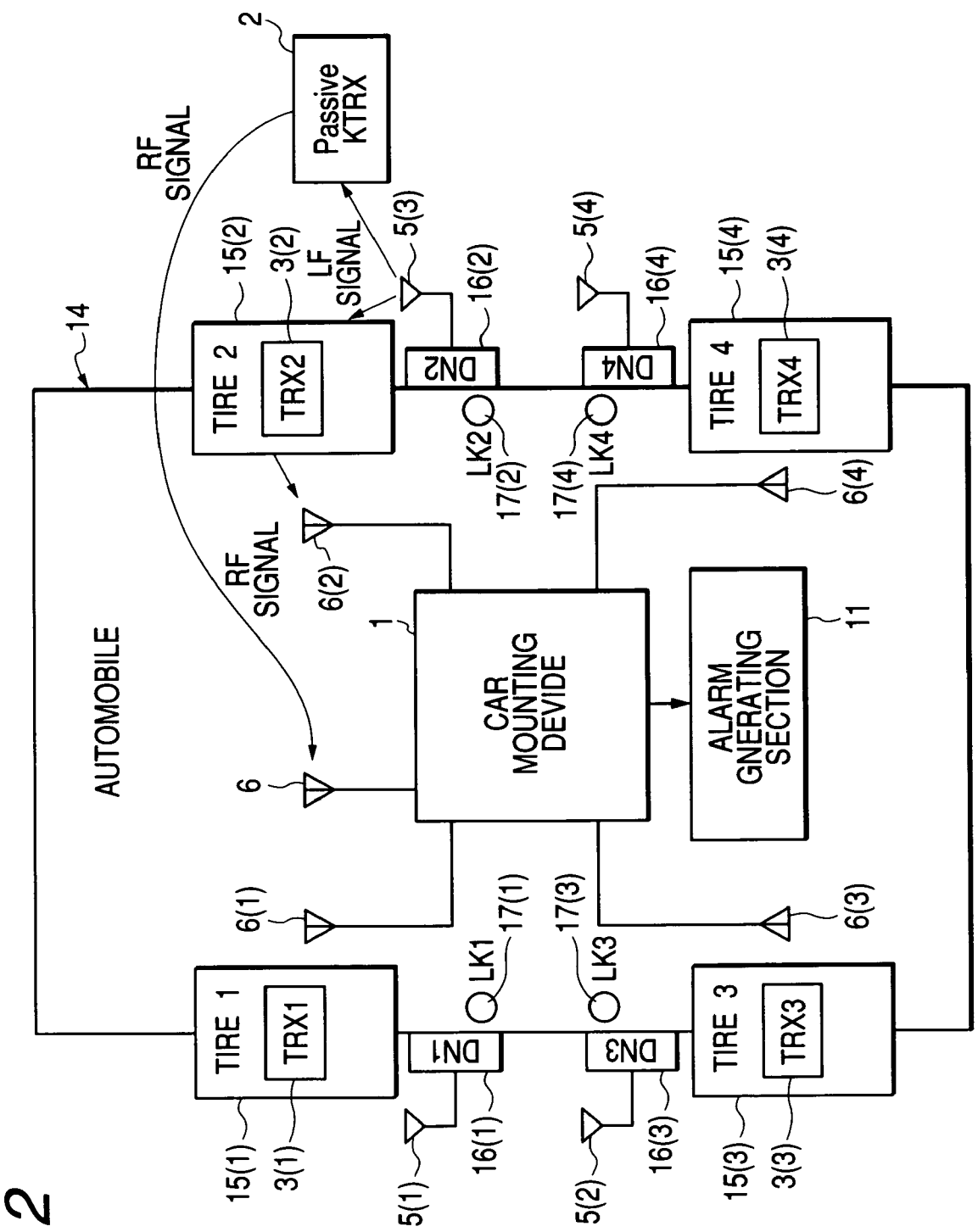
FIG. 2 is an arrangement view schematically showing a state in which the passive keyless entry device having the tire pneumatic pressure monitoring function shown in FIG. 1 is mounted to an automobile.

FIG. 2 is an arrangement view schematically showing a state in which the passive keyless entry device having the tire pneumatic pressure monitoring function shown in FIG. 1 is mounted to the automobile.

As shown in FIG. 2, the automobile 14 has four tires 15(1), 15(2), 15(3), 15(4). A transmitter-receiver (TRX1) 3(1) for monitoring the tire pneumatic pressure is mounted to the tire 15(1). A transmitter-receiver (TRX2) 3(2) for monitoring the tire pneumatic pressure is mounted to the tire 15(2). A transmitter-receiver (TRX3) 3(3) for monitoring the tire pneumatic pressure is mounted to the tire 15(3). A transmitter-receiver (TRX4) 3(4) for monitoring the tire pneumatic pressure is mounted to the tire 15(4). Each transmitter-receiver for monitoring the tire pneumatic pressure has a pneumatic pressure sensor for measuring the pneumatic pressure and a temperature sensor for measuring the temperature within the tire, and further has a battery for driving. In the automobile 14, a door knob (DN1) 16(1) and a door lock mechanism (LK1) 17(1) are arranged in a door on the side of a driver's seat. A door knob (DN2) 16(2) and a door lock mechanism (LK2) 17(2) are arranged in a door on the side of an assistant seat. A door knob (DN3) 16(3) and a door lock mechanism (LK3) 17(3) are arranged in a door on the side of a left rear portion seat. A door knob (DN4)

16(4) and a door lock mechanism (LK4) 17(4) are arranged in a door on the side of a right rear portion seat. The car mounting device 1 shown in FIG. 1 is mounted into the automobile 14, and the keyless entry portable device (KTRX) 2 carried by a user (driver) is arranged outside the automobile 14.

In FIG. 2, the same constructional elements as the constructional elements shown in FIG. 1 are designated by the same reference numerals.

A request signal transmitted from the four low frequency wave transmitting antenna 5(1), 5(2), 5(3), 5(4) is constructed by a first request signal having a code showing a signal directed to the passive keyless entry portable device, and a second request signal having a code showing a signal addressed to the transmitter-receiver for monitoring the tire pneumatic pressure. Each of the first and second request signals has an identification code (hereinafter generally called an ID code) for identifying the low frequency wave transmitting antennas 5(1), 5(2), 5(3), 5(4). Accordingly, there are eight different request signals in total. The controller 9 controls which request signal is transmitted. The first answer signal has an ID code for distinguishing the passive keyless entry portable device. The second answer signal includes an ID code for distinguishing the transmitter-receiver for monitoring the tire pneumatic pressure, measuring data of the pneumatic pressure, and measuring data of temperature.

Figure 3:
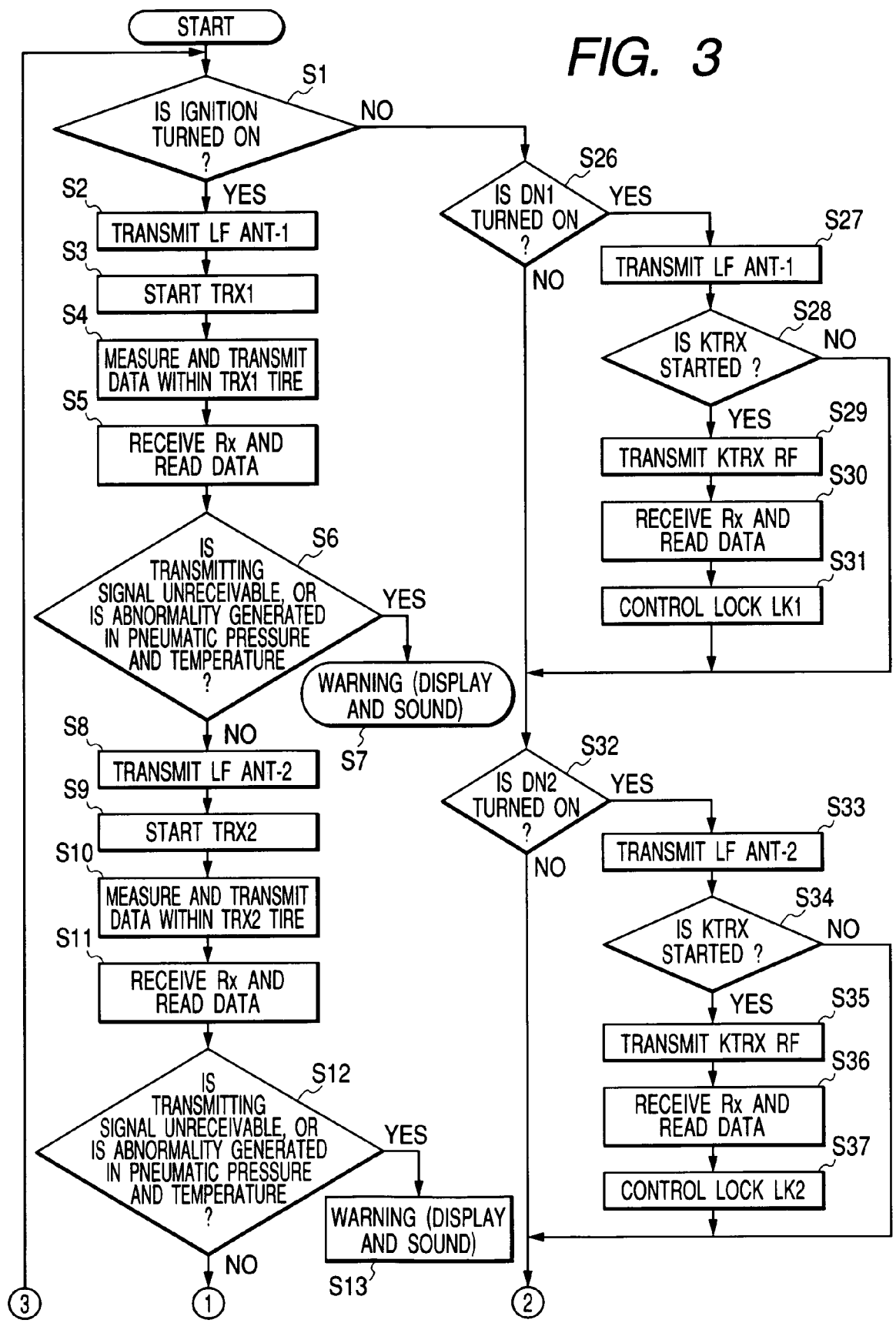
FIG. 3 is a flow chart showing one example of operational details of the passive keyless entry device having the tire pneumatic pressure monitoring function shown in FIG. 1 and showing the first half portion of these operational details.
Figure 4:
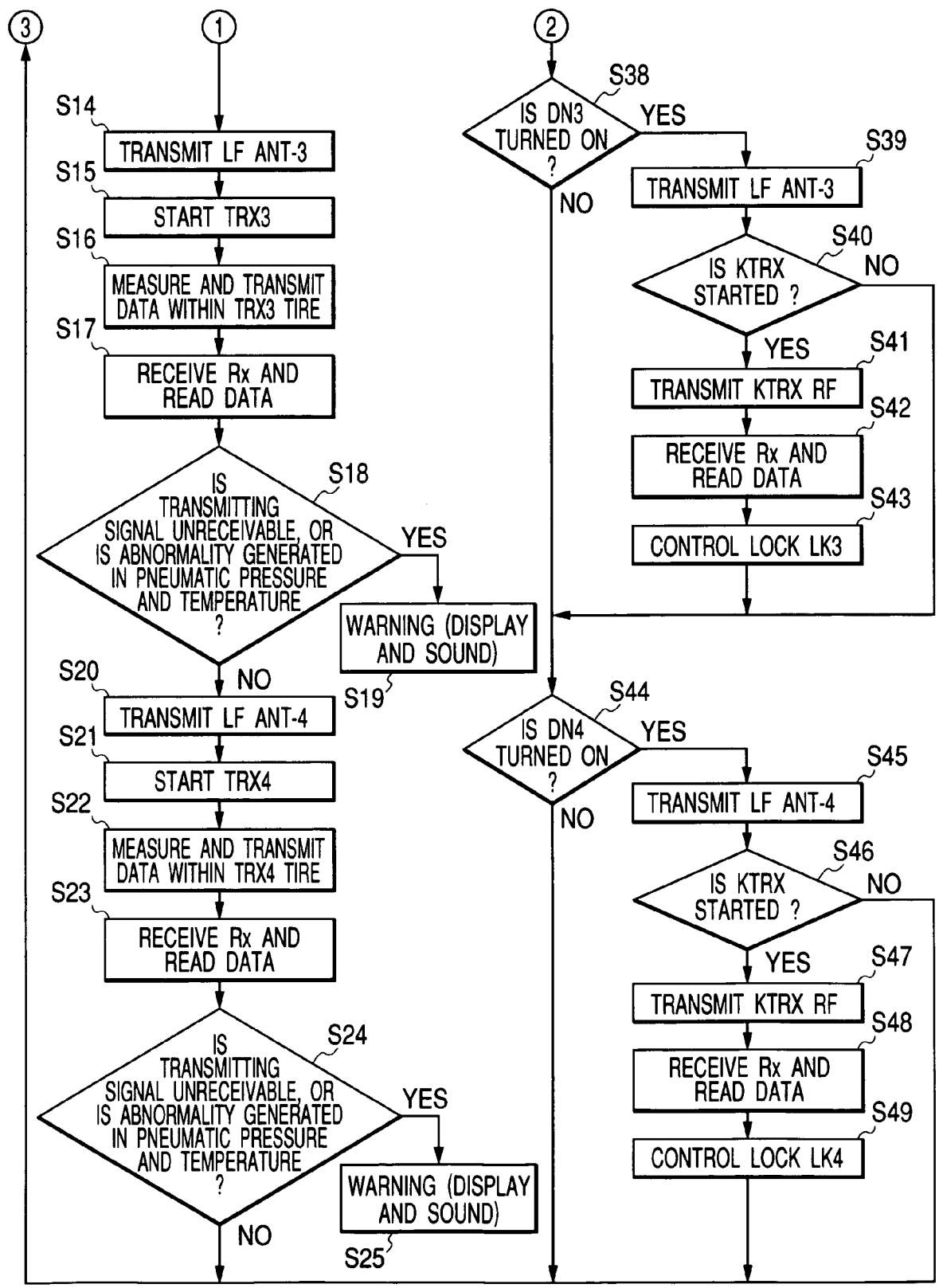
FIG. 4 is a flow chart showing one example of the operational details of the passive keyless entry device having the tire pneumatic pressure monitoring function shown in FIG. 1 and showing the latter half portion of these operational details.
Figure 5:
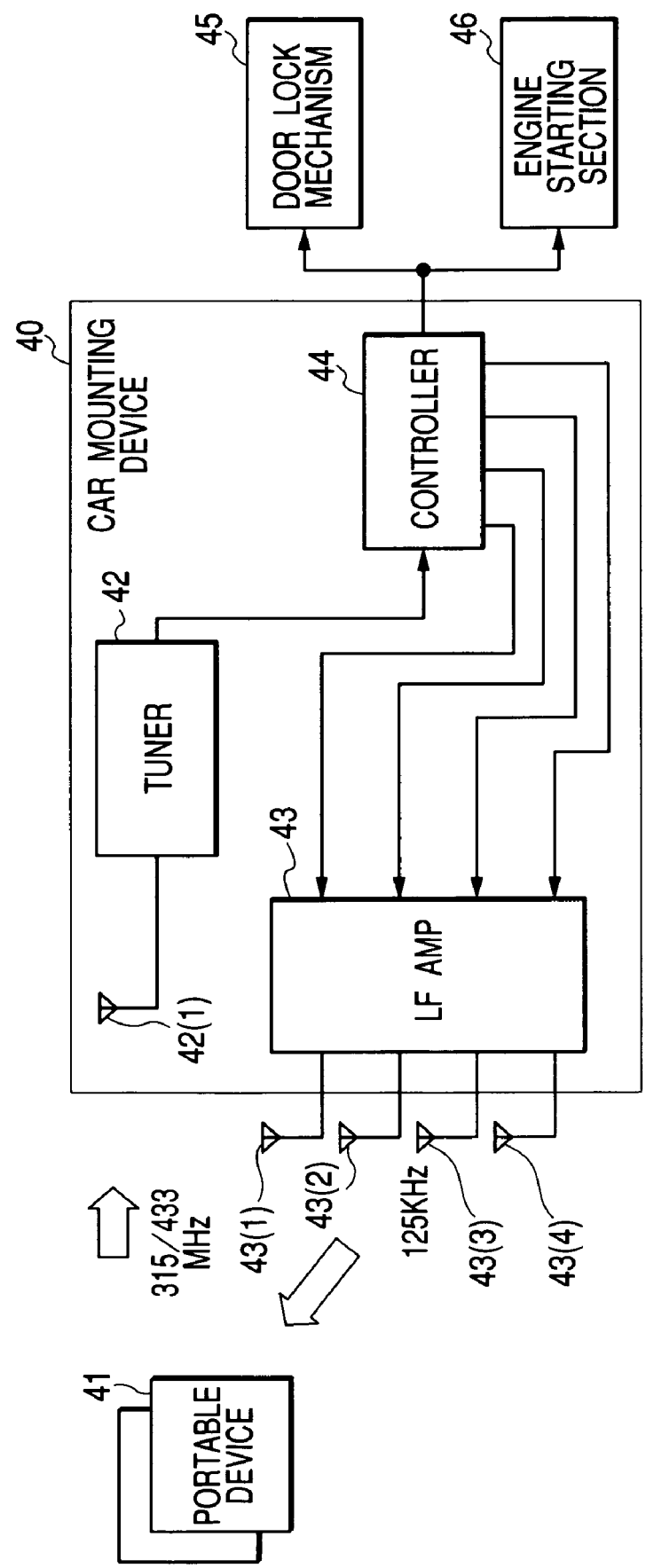
FIG. 5 is a block diagram showing one example of the construction of a main portion of the already known passive keyless entry (passive RKE) device.
Figure 6:
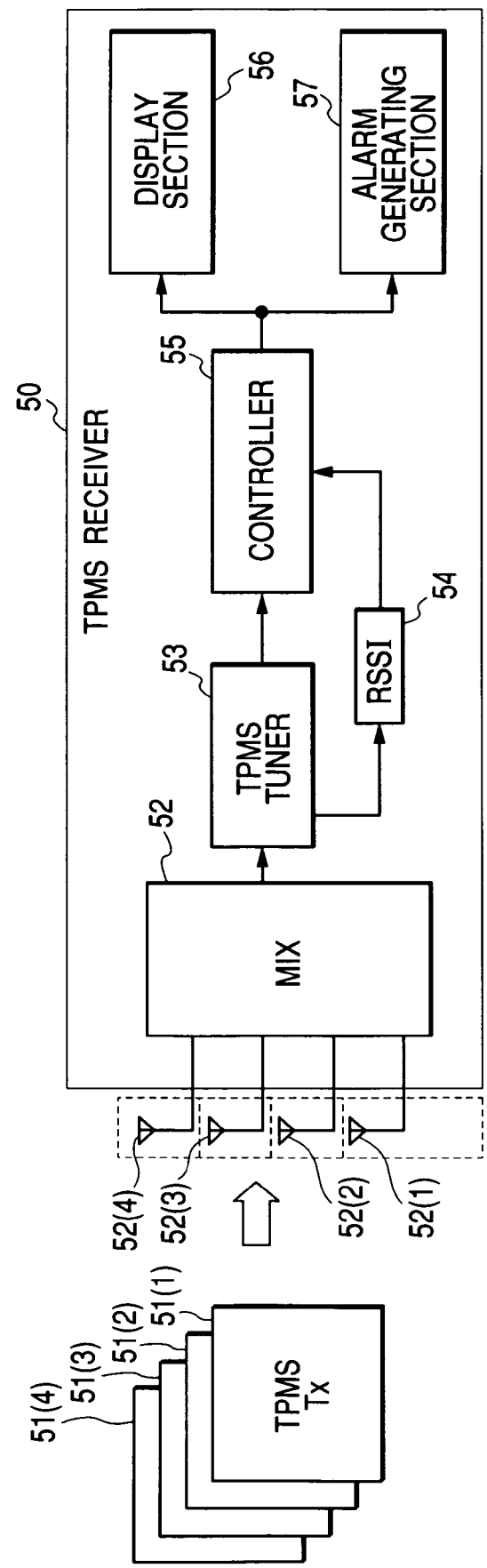
FIG. 6 is a block diagram showing one example of the construction of a main portion of the already known tire pneumatic pressure monitoring device (TPMS).

FIGS. 3 and 4 are flow charts showing one example of operational details of the passive keyless entry device having the tire pneumatic pressure monitoring function shown in FIG. 1. FIG. 3 shows the first half portion of these operational details and FIG. 4 shows the latter half portion of these operational details.

The operation of the passive keyless entry device having the tire pneumatic pressure monitoring function in this embodiment mode will be explained by using the flow charts shown in FIGS. 3 and 4.

In a step S1, the controller 9 first judges whether the ignition 13 is turned on or not. When the controller 9 judges that the ignition 13 is turned on (in the case of Y), it proceeds to the next step S2. In contrast to this, when the controller 9 judges that the ignition 13 is turned off (in the case of N), it proceeds to another step S26.

Next, in the step S2, the controller 9 forms a second request signal having the ID code of the low frequency wave transmitting antenna 5(1), and the low frequency signal amplifying section 5 amplifies the formed second request signal, and then transmits the amplified second request signal from the low frequency wave transmitting antenna 5(1) to the transmitter-receiver (TRX1) 3(1) for monitoring the tire pneumatic pressure.

Next, in a step S3, the transmitter-receiver (TRX1) 3(1) for monitoring the tire pneumatic pressure receives the second request signal transmitted from the car mounting device 1, and authenticates the ID code and then attains a starting state.

In subsequent step S4, the transmitter-receiver (TRX1) 3(1) for monitoring the tire pneumatic pressure measures the tire pneumatic pressure within the tire 15(1) by a pressure sensor, and also measures the temperature of the tire by a temperature sensor. The transmitter-receiver (TRX1) 3(1) for monitoring the tire pneumatic pressure then transmits the measured detecting signal and the second answer signal having the ID showing the transmitter-receiver 3(1) for monitoring the tire pneumatic pressure to the car mounting device 1 as a high frequency wireless signal.

In subsequent step S5, when the car mounting device 1 receives this high frequency wireless signal by the high frequency wave receiving antenna 6(1), the car mounting device 1 transmits this high frequency wireless signal to the tuner section 7 for monitoring the tire pneumatic pressure through the mixer section 6, and regenerates the second answer signal by the receiving section 7 for monitoring the tire pneumatic pressure. Thereafter, this second answer signal is supplied to the signal intensity instructing section 8, and is converted into a signal showing signal intensity. The controller 9 authenticates the ID code of the second answer signal and also reads the detecting signal.

Next, in a step S6, the controller 9 judges whether no high frequency wireless signal can be received from the transmitter-receiver 3(1) for monitoring the tire pneumatic pressure, or the tire pneumatic pressure and/or the tire temperature does not lie within a prescribed range from the detecting signal. When the controller 9 judges that no high frequency wireless signal can be received, or the tire pneumatic pressure and/or the tire temperature does not lie within the prescribed range (in the case of Y), it proceeds to the next step S7. In contrast to this, when the controller 9 judges that the high frequency wireless signal can be received, or the tire pneumatic pressure and the tire temperature lie within the prescribed range (in the case of N), it proceeds to another step S8.

Next, in the step S7, the controller 9 supplies a driving signal to the alarm generating section 11, and operates the alarm generating section 11. At this time, the controller 9 can inform the user (driver) which portion has become abnormal by making the display section 10 display the tire pneumatic pressure and the tire temperature.

Further, in the step S8, the controller 9 forms a second request signal having the ID code of the low frequency wave transmitting antenna 5(2), and the low frequency signal amplifying section 5 amplifies the formed second request signal and then transmits the amplified second request signal from the low frequency wave transmitting antenna (LF ANT-2) 5(2) to the transmitter-receiver (TRX2) 3(2) for monitoring the tire pneumatic pressure.

Next, in a step S9, the transmitter-receiver (TRX2) 3(2) for monitoring the tire pneumatic pressure receives the second request signal transmitted from the car mounting device 1, and authenticates the ID code and then attains a starting state.

Next, in a step S10, the transmitter-receiver (TRX2) 3(2) for monitoring the tire pneumatic pressure measures the tire pneumatic pressure within the tire 15(2) by a pressure sensor and also measures the temperature of the tire by a temperature sensor. The transmitter-receiver (TRX2) 3(2) for monitoring the tire pneumatic pressure then transmits the measured detecting signal and the second answer signal having the ID showing the transmitter-receiver 3(2) for monitoring the tire pneumatic pressure to the car mounting device 1 as a high frequency wireless signal. The controller 9 authenticates the ID of the second answer signal, etc. and reads the detecting signal.

In subsequent step S11, when the car mounting device 1 receives this high frequency wireless signal by the high frequency wave receiving antenna 6(2), the car mounting device 1 transmits this high frequency wireless signal to the receiving section 7 for monitoring the tire pneumatic pressure through the mixer section 6, and regenerates the second answer signal by the receiving section 7 for monitoring the tire pneumatic pressure. Thereafter, the second answer signal is supplied to the signal intensity instructing section 8, and is converted into a signal showing signal intensity. The controller 9 authenticates the ID code of the second answer signal and reads the detecting signal.

Subsequently, in a step S12, the controller 9 judges whether no high frequency wireless signal can be received from the transmitter-receiver (TRX2) 3(2) for monitoring the tire pneumatic pressure, or the tire pneumatic pressure and/or the tire temperature does not lie within the prescribed range from the detecting signal. When the controller 9 judges that no high frequency wireless signal can be received, or the tire pneumatic pressure and/or the tire temperature does not lie within the prescribed range (in the case of Y), it proceeds to the next step S13. In contrast to this, when the controller 9 judges that the high frequency wireless signal can be received, or the tire pneumatic pressure and the tire temperature lie within the prescribed range (in the case of N), it proceeds to another step S14.

Next, in the step S13, the controller 9 supplies a driving signal to the alarm generating section 11 and operates the alarm generating section 11. At this time, the controller 9 can inform the user (driver) which portion has become abnormal by making the display section 10 display the tire pneumatic pressure and the tire temperature.

In the following description, the operations from step S14 to step S19 are similar to the operations already described except that the transmitter-receiver for monitoring the tire pneumatic pressure for transmitting and receiving the second request signal and the second answer signal and the low frequency wave transmitting antenna are respectively replaced with the transmitter-receiver (TRX3) 3(3) for monitoring the tire pneumatic pressure and the low frequency wave transmitting antenna 5(3).

Subsequent operations from step S20 to step S25 are also similar to the operations already described except that the transmitter-receiver for monitoring the tire pneumatic pressure for transmitting and receiving the second request signal and the second answer signal and the low frequency wave transmitting antenna are respectively replaced with the transmitter-receiver (TRX4) 3(4) for monitoring the tire pneumatic pressure and the low frequency wave transmitting antenna 5(4).

On the other hand, in a step S26, the controller 9 judges whether the door lock mechanism (LK1) 17(1) of the door is in a locking (ON) state or not. When the controller 9 judges that the door lock mechanism (LK1) 17(1) is in the ON state (in the case of Y), it proceeds to the next step S27. In contrast to this, when the controller 9 judges that no door lock mechanism (LK1) 17(1) is in the ON state (in the case of N), it proceeds to another step S32.

Next, in a step S27, the controller 9 forms a first request signal having the ID code of the low frequency wave transmitting antenna 5(1), and the low frequency signal amplifying section 5 amplifies the formed first request signal and then transmits the amplified first request signal from the low frequency wave transmitting antenna 5(1) to the passive keyless entry portable device 2.

Next, in a step S28, the passive keyless entry portable device 2 attains a starting state when the passive keyless entry portable device 2 receives the first request signal transmitted from the car mounting device 1, and it proceeds to the next step S29. In contrast to this, when it is far away from the passive keyless entry portable device 2 and no first request signal is received, a non-starting state is maintained and it proceeds to another step S32.

In the subsequent step S29, the passive keyless entry portable device 2 forms a first answer signal including the ID proper to the passive keyless entry portable device 2 in response to the received first request signal, and transmits the formed first answer signal to the car mounting device 1 as a high frequency wireless signal.

Subsequently, in a step S30, when the car mounting device 1 receives this high frequency wireless signal by the high frequency wave receiving antenna 4(1), the car mounting device 1 transmits the received high frequency signal to the receiving section 4 for the passive keyless entry and regenerates the first answer signal including the ID by the receiving section 4 for the passive keyless entry, and supplies the regenerated first answer signal to the controller 9.

Next, in a step S31, the controller 9 judges whether the supplied ID is conformed to one of some IDs already registered or not. When the controller 9 judges that the supplied ID is conformed to the ID already registered, the controller 9 unlocks the lock of the door lock mechanism (LK1) 17(1) on the basis of commands of the first answer signal.

Further, in a step S32, the controller 9 judges whether the door lock mechanism (LK2) 17(2) of the door is in a locking (ON) state or not. When the controller 9 judges that the door lock mechanism (LK2) 17(2) is in the ON state (in the case of Y), it proceeds to the next step S33. In contrast to this, when the controller 9 judges that no door lock mechanism (LK2) 17(2) is in the ON state (in the case of N), it proceeds to another step S38.

Next, in the step S33, the controller 9 forms a first request signal having the ID code of the low frequency wave transmitting antenna 5(2), and the low frequency signal amplifying section 5 amplifies the formed first request signal and then transmits the amplified first request signal from the low frequency wave transmitting antenna 5(2) to the passive keyless entry portable device 2.

Next, in a step S34, the passive keyless entry portable device 2 attains a starting state when the passive keyless entry portable device 2 receives the first request signal transmitted from the car mounting device 1, and it proceeds to the next step S35. In contrast to this, when no first request signal is received, a non-starting state of the passive keyless entry portable device 2 is maintained and it proceeds to another step S38.

In the subsequent step S35, the passive keyless entry portable device 2 forms a first answer signal including the ID proper to the passive keyless entry portable device 2 in response to the received first request signal, and transmits the formed first answer signal to the car mounting device 1 as a high frequency wireless signal.

Subsequently, in a step S36, when the car mounting device 1 receives this high frequency wireless signal by the high frequency wave receiving antenna 4(1), the car mounting device 1 transmits the received high frequency signal to the receiving section 4 for the keyless entry and regenerates the first answer signal including the ID by the receiving section 4 for the keyless entry and supplies the regenerated first answer signal to the controller 9.

Next, in a step S37, the controller 9 judges whether the supplied ID is conformed to one of some IDs already registered or not. When the controller 9 judges that the supplied ID is conformed to the already registered ID, the controller 9 unlocks the lock of the door lock mechanism (LK2) 17(2) on the basis of commands of the first answer signal.

In the following description, the operations from step S38 to step S43 are similar to the operations already described except that the low frequency wave transmitting antenna for transmitting the first request signal and the door lock mechanism as a control object are respectively replaced with the low frequency wave transmitting antenna 5(3) and the door lock mechanism (LK3) 17(3).

The operations of subsequent steps S44 to S49 are also similar to the operations already described except that the low frequency wave transmitting antenna for transmitting the first request signal and the door lock mechanism as a control object are respectively replaced with the low frequency wave transmitting antenna 5(4) and the door lock mechanism (LK4) 17(4).

Thus, in accordance with this embodiment mode, the tire pneumatic pressure is monitored by bidirectional communication. Accordingly, the transmitter-receiver for monitoring the tire pneumatic pressure mounted to the tire measures the tire pressure only when the request signal is received from the car mounting device, and it is sufficient for the transmitter-receiver for monitoring the tire pneumatic pressure to transmit the answer signal. Accordingly, electric current consumption can be greatly reduced and the consumption of a battery is restrained so that its life can be extended. Accordingly, the disadvantages that the battery is consumed in a short period and no information of the tire pneumatic pressure is obtained, etc. are removed so that safety is improved. Further, one portion of the tire pneumatic pressure monitoring device using the bidirectional communication is also used in the passive keyless entry device so that the number of constructional parts can be reduced and the space within the car can be effectively utilized. Further, since the function of the passive keyless entry and the function of the tire pneumatic pressure monitoring device are generalized and controlled, no interference of both the functions is caused.

The above embodiment mode is constructed such that a warning using display and a sound is generated when there is an abnormality in the pneumatic pressure or temperature. However, it is also useful to display the measuring value when there is no abnormality. Further, the transmitter-receiver for monitoring the tire pneumatic pressure may also transmit the second answer signal only when there is an abnormality in the tire pneumatic pressure or temperature after the transmitter-receiver for monitoring the tire pneumatic pressure receives the second request signal. Further, the low frequency wave transmitting antenna may be also arranged in the interior of a door or its vicinity in addition to the arrangement within a door knob. Further, in the above embodiment mode, the high frequency wave receiving antenna for the passive keyless entry and the high frequency wave receiving antenna for monitoring the tire pneumatic pressure are separately arranged, but can be also commonly used since the first answer signal and the second answer signal can be distinguished from each other by ID codes. In this case, the passive keyless entry receiving section and the receiving section for monitoring the tire pneumatic pressure can be also commonly used by distinguishing the ID codes from each other. Further, four high frequency wave receiving antennas for monitoring the tire pneumatic pressure may not be necessarily arranged, but one high frequency wave receiving antenna for monitoring the tire pneumatic pressure may be also arranged if this high frequency wave receiving antenna can sensitively receive the second answer signal in short since the ID is given every transmitter-receiver for monitoring the tire pneumatic pressure.

As mentioned above, in accordance with the present invention, the tire pneumatic pressure is monitored by the bidirectional communication. Accordingly, it is sufficient for the transmitter-receiver for monitoring the tire pneumatic pressure mounted to the tire to measure the tire pressure and transmit the answer signal only when this transmitter-receiver receives the request signal from the car mounting device. Therefore, electric current consumption can be greatly reduced and the consumption of a battery is restrained and its life can be extended. Accordingly, the disadvantages that the battery is consumed in a short period and no information of the tire pneumatic pressure is obtained, etc. are removed so that safety is improved. Further, the controller used in the passive keyless entry device and the controller used in the tire pneumatic pressure monitoring device are commonly used. Furthermore, the low frequency signal transmitting section for transmitting the low frequency request signal and four low frequency wave transmitting antennas are commonly used in both the keyless entry portable device of the passive keyless entry device and the transmitter-receiver for monitoring the tire pneumatic pressure in the tire pneumatic pressure monitoring device. The high frequency wireless signal transmitted from the keyless entry portable device is individually received by the receiving section for the keyless entry, and the high frequency wireless signal transmitted from the transmitter-receiver for monitoring the tire pneumatic pressure is individually received by the receiving section for monitoring the tire pneumatic pressure. Processing signals processed by both the receiving sections are supplied to the commonly used controller. The commonly used controller performs an operation so as to control the operation of the door lock mechanism and display the tire pneumatic pressure information. Accordingly, the function of the passive keyless entry device and the function of the tire pneumatic pressure monitoring device can be alternately achieved by using a small number of constructional parts. Therefore, there are effects in that the space within the car can be effectively utilized without generating the interference between both the devices.

What is claimed is:

1. A passive keyless entry device for monitoring a tire pneumatic pressure by bidirectional communication comprises:
   a car mounting device mounted to an automobile;
   a keyless entry portable device; and
   a transmitter-receiver for monitoring the tire pneumatic pressure,
   wherein said car mounting device comprises a low frequency signal transmitting section for transmitting a request signal of a low frequency to said keyless entry portable device and said transmitter-receiver for monitoring the tire pneumatic pressure, a receiving section for a keyless entry for receiving an answer signal of a high frequency responsive to said request signal from said keyless entry portable device, a receiving section for monitoring the tire pneumatic pressure for receiving the answer signal of the high frequency responsive to said request signal from said transmitter-receiver for monitoring the tire pneumatic pressure, and a controller for forming said request signal and controlling operation of a door lock mechanism in response to said answer signal and obtaining tire pneumatic pressure information.

2. The passive keyless entry device for monitoring the tire pneumatic pressure by the bidirectional communication, according to claim 1, wherein four antennas for transmitting low frequencies commonly used are connected to said keyless entry portable device and said transmitter-receiver for monitoring the tire pneumatic pressure in said low frequency signal transmitting section.

3. The passive keyless entry device for monitoring the tire pneumatic pressure by the bidirectional communication, according to claim 1, wherein four receiving antennas for high frequencies are connected to said receiving section for monitoring the tire pneumatic pressure.

4. The passive keyless entry device for monitoring the tire pneumatic pressure by the bidirectional communication, according to claim 1, wherein said transmitter-receiver for monitoring the tire pneumatic pressure obtains the pneumatic pressure information from a pneumatic pressure sensor mounted to each tire.

5. The passive keyless entry device for monitoring the tire pneumatic pressure by the bidirectional communication, according to claim 1, wherein the request signal containing a first request signal having a code showing a signal directed to the passive keyless entry device, and a second request signal having a code showing a signal addressed to the transmitter-receiver

6. The passive keyless entry device for monitoring the tire pneumatic pressure by the bidirectional communication, according to claim 5, wherein a plurality of antennas for transmitting low frequencies commonly used are connected to said keyless entry portable device and said transmitter-receiver for monitoring the tire pneumatic pressure in said low frequency signal transmitting section.

7. The passive keyless entry device for monitoring the tire pneumatic pressure by the bidirectional communication, according to claim 6, wherein each of the first and second request signals has an identification code to identify the antenna from which the low frequency wave has been transmitted.

8. The passive keyless entry device for monitoring the tire pneumatic pressure by the bidirectional communication, according to claim 5, wherein each of the first and second request signals has an identification code to identify a particular antenna from which a low frequency wave has been transmitted.

\* \* \* \* \*